Figure 1:
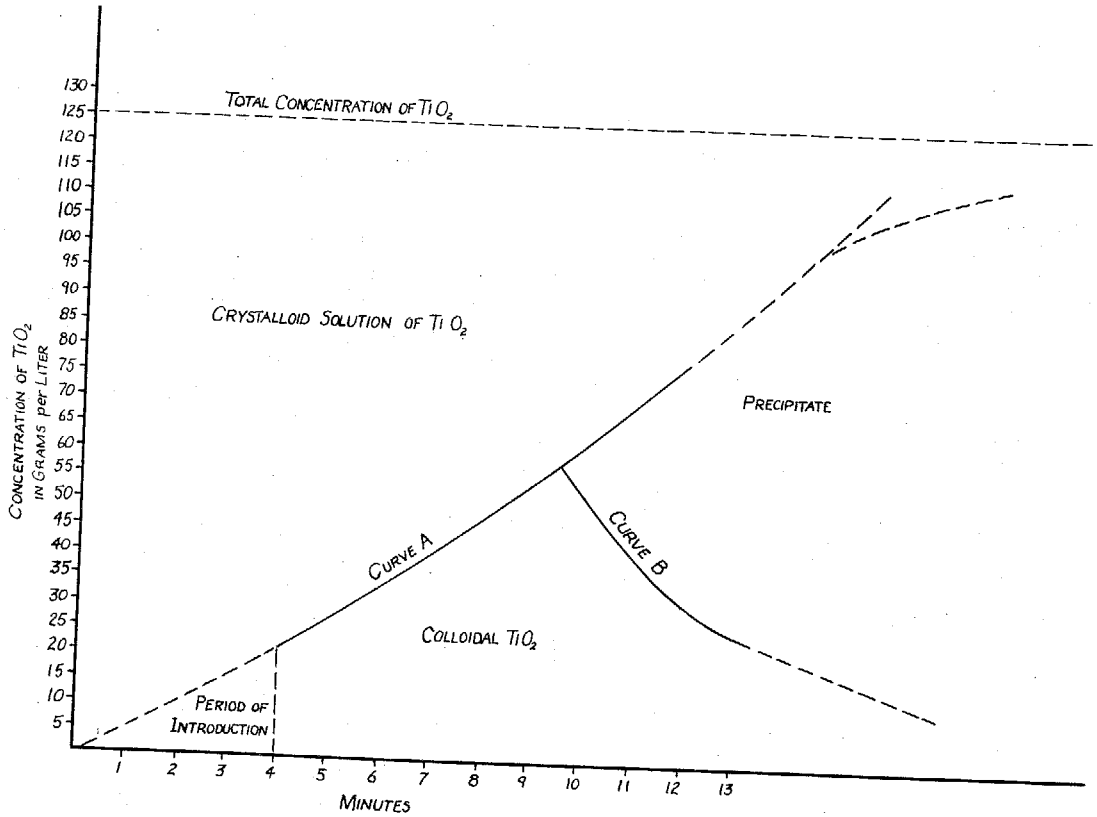

May 30, 1933.

J. BLUMENFELD

PRODUCTION OF TITANIUM DIOXIDE

Re. 18,854

Original Filed Feb. 2, 1928

2 Sheets-Sheet 1

Joseph Blumenfeld
INVENTOR

BY Merrill E. Clark
ATTORNEY

J. BLUMENFELD

May 30, 1933. PRODUCTION OF TITANIUM DIOXIDE Re. 18,854

2 Sheets-Sheet 2

Original Filed Feb. 2, 1928

Joseph Blumenfeld

INVENTOR

BY Merrell E. Clark

ATTORNEY

Reissued May 30, 1933

Re. 18,854

UNITED STATES PATENT OFFICE

JOSEPH BLUMENFELD, OF NEUILLY-SUR-SEINE, FRANCE, ASSIGNOR, BY MESNE ASSIGNMENTS, TO KREBS PIGMENT AND COLOR CORPORATION, OF NEWARK, NEW JERSEY, A CORPORATION OF DELAWARE

PRODUCTION OF TITANIUM DIOXIDE

Original No. 1,795,467, dated March 10, 1931, Serial No. 251,253, filed February 2, 1928. Application for reissue filed April 26, 1932. Serial No. 607,611.

This invention relates to a process for preparing titanium hydroxide or oxide by the hydrolysis of sulfuric acid solutions containing titanium at elevated temperatures.

These solutions are obtained, for instance, by the action of sulfuric acid on titanium-bearing ores such as ilmenite, rutile, or the like. The preparation of such solutions is a well-known step in the art and has been described by me in Patent 1,504,669. Solutions of this character usually contain iron and may also contain various other impurities.

The chemical composition of the solutions in question may vary within wide limits, and the precise chemical linkage of the titanium and sulfuric acid is not completely understood. From such solutions, titanyl sulfate ($TiOSO_4 2H_2O$) may be crystallized under certain conditions; but at the same time some persons are of the opinion that the titanium is present in solution as the normal sulfate. Whatever the exact chemical compositions may be, the fact is that the final equilibrium of such solutions is directly proportional to the concentration of the $SO_4$ and $TiO_2$ ions present.

By proper chemical treatment the sulfuric acid solutions of titanium may be caused to undergo hydrolysis, with the resultant formation of a precipitate of free titanium hydroxide or oxide and an attendant increase of free acidity of the solution. It should be noted, also, that the facts concerning the relation between titanium hydroxide and titanium dioxide are not completely known at the present time. When titanium solutions are treated chemically in a manner that should ordinarily produce a metallic hydroxide, the resultant product apparently undergoes a transition during drying and when fully dry is found to be titanium dioxide ($TiO_2$). Hereafter, in the present specification and claims, the hydrolysis product is referred to as titanium dioxide.

In existing hydrolysis processes the solutions of titanium oxide are brought to a previously determined acid concentration and are then subjected to heating in various ways, such as boiling at atmospheric pressure or in autoclaves under elevated pressure, or in bacuo in some instances; the volume being maintained constant by refluxing or by adding fresh water. In all cases the solutions subjected to hydrolysis are true solutions and possess the homogeneity which characterizes crystalloid solutions.

There is a wide variance in the physical and chemical properties of titanium dioxide produced by hydrolysis, dependent upon the exact conditions under which the hydrolysis takes place. The object of the present invention is to provide an improved hydrolysis process, whereby titanium dioxide of consistently uniform properties may be produced rapidly and in good yield. Another object of the invention is to achieve this favorable result in a solution of relatively high concentration, so that the sulfuric acid present and formed during the process may be recovered and concentrated economically. Other objects of the invention will become apparent.

The presence of iron in the solution to be hydrolyzed does not interfere with the reaction, but if much is present in solution the precipitated titanium dioxide is likely to become contaminated with iron. For this reason it is desirable to adjust the iron content of the solution to be hydrolyzed so that it does not contain more than 20–25 grams of iron as ferrous sulfate per liter. This may be done by simple crystallization of the ferrous sulfate, or by an improved process of refrigeration as described in my Patent No. 1,707,248.

In order that the present invention may be appreciated, reference is made to an example showing a method of hydrolyzing in the ordinary way.

A solution of titanium containing 200 grams per liter of $TiO_2$ and 500 grams per liter of $H_2SO_4$ free or combined with titanium is diluted cold to a concentration of 400 grams per liter of $H_2SO_4$ and 160 grams per liter of $TiO_2$. This diluted solution is then heated to and maintained at a temperature of 100° C. and gives by hydrolysis the very low yield of precipitated $TiO_2$ of about 30%, the time taken to obtain this yield being about 24 hours.

I have now discovered that the speed of hydrolysis and quantitative yield of products may be increased and the quality of the precipitated $TiO_2$ may be improved if the hydrolysis of the crystalloid solution is carried out in the presence of $TiO_2$ in colloidal form. For example, if to the solution to be hydrolyzed as previously described there is first added about thirty grams per liter of colloidal $TiO_2$ and exactly the same method of hydrolysis is adopted, a yield of about 95% $TiO_2$ is obtained in about three hours.

To achieve these favorable results one may either add specially prepared colloidal titanium dioxide to the solution prior to hydrolysis, or one may conduct the hydrolysis itself in such a manner that an adequate quantity of colloidal $TiO_2$ is produced in the solution prior to any actual precipitation of $TiO_2$. This latter method is the most suitable for practical use and is illustrated by the following example:

*Example I*

The titanium solution used for hydrolysis was prepared by treating a titanium bearing ore (ilmenite) with sulfuric acid. The reaction product was dissolved in water and sufficient scrap iron was added to react with the acid present and convert all of the iron present to the ferrous form. The iron content of the solution was then reduced by crystallizing the major portion of the contained ferrous sulfate and removing it from the solution.

The solution had the following composition:

| | Grams per liter |
|---|---|
| $TiO_2$ | 190–210 |
| Fe (ferrous) | 20– 25 |
| $H_2SO_4$ | 500–550 |

This solution was concentrated until the sulfuric acid, free and combined with titanium (excluding the acid combined with the iron) was about 600 grams per liter.

100 cc. of this solution, heated to about 100° C., was added at a uniform speed with stirring over a period of 4 minutes to 100 cc. of boiling water. During the first quarter minute of the addition a turbidity was noted, but this disappeared almost immediately and the solution regained its original appearance.

The temperature of the mixture was maintained at about 103° C. and the stirring was continued. After about ten minutes turbidity was again observed and a few minutes later the solution turned gray in color and $TiO_2$ commenced precipitating. The reaction was complete in about three hours and a yield of 95% $TiO_2$ was obtained.

The trend of the described reaction was determined by observation and analysis and the results for the first ten minutes after all of the solution had been added are shown in Table 1.

*Table 1*

| Minute of reaction | Appearance of solution | Grams per liter | | |
|---|---|---|---|---|
| | | $TiO_2$ in solution | $TiO_2$ in colloidal form | Precipitated $TiO_2$ |
| 4 | Clear | 104 | 21.1 | 0 |
| 5 | Clear | 97 | 28.2 | -------- |
| 6 | Clear | 92 | 33.0 | -------- |
| 7 | Very slight cloudiness | 84 | 40.8 | -------- |
| 8 | Very slight cloudiness | 78 | 46.8 | -------- |
| 9 | Slightly cloudy | 70 | 55.0 | -------- |
| 10 | Cloudy | 71 | 53.6 | -------- |
| 11 | Very cloudy | -------- | 41.0 | -------- |
| 12 | White | 45 | 31.6 | 48.2 |
| 13 | White | 43 | 26.6 | 55.2 |

In the above table, the precipitated $TiO_2$ was determined by the simple expedient of filtering the solution. The colloidal $TiO_2$ in the filtered solution was determined by first coagulating it by adding concentrated hydrochloric acid, and then filtering.

The data shown in Table 1 is also shown graphically in Fig. 1, where the concentration of $TiO_2$ is plotted against the time during hydrolysis. Throughout the experiment, the total weight of $TiO_2$ present naturally remains the same. At the first state of the reaction, all of the $TiO_2$ is present in crystalloid solution. Curve A shows the progressive increase in the total amount of $TiO_2$ not in crystalloid solution. At first all of the non-soluble $TiO_2$ is present in colloidal form. However, when a certain point is reached— i. e., at the juncture of curves A and B, the amount of colloidal material present falls off. Curve B shows colloidal material alone, and indicates how it decreases in amount during the rest of the reaction. Obviously, the difference between curves A and B shows the amount of $TiO_2$ precipitated. It should be noted that Fig. 1 shows only the first few minutes of the reaction. As the hydrolysis proceeds further, curve A rises to approach the total concentration of $TiO_2$ present, and curve B drops off. In other words, the amount of precipitated $TiO_2$ increases and the quantity of colloidal $TiO_2$ decreases.

The reaction occurring during the first few minutes determines the yield and speed of hydrolysis and the quality of the resultant product. At the same time, this initial reaction is controlled by temperature, speed of mixing, and other variables.

The rapidity and high yield of the hydrolysis described in Example I is best understood in conjunction with Fig. 1, in which the course of the reaction is charted.

Under the conditions of the reaction, colloidal $TiO_2$ is formed immediately on contacting the solution with water. This is shown clearly on Fig 1, for at the end of the period of introduction there is already present about 20 grams per liter of colloidal material. At low acid concentrations, such as prevail when only a part of the solution has been added to the water, the tendency to hydrolyze is the greatest,—the reaction occurring at very low temperatures.

As a result of my experiments, I have determined that it is the presence of an adequate quantity of colloidal $TiO_2$ in the mixture that causes the improved yield and rate of hydrolysis. The exact manner in which the colloidal phase promotes the precipitation is not known. Presumably, the titanium in crystalloid solution must pass through the colloidal phase before precipitation. Whether the presence of a large quantity of colloid promotes this reaction through a simple transfer, in accordance with the mass low, or as a contract catalyst, is not known.

*Example II*

If the hydrolysis described under Example I is repeated in the same manner except that a lesser quantity of solution is added to the water, the rate of addition remaining uniform, the hydrolysis will occur in the same way except that it will be completed in a shorter time.

Figure 2:
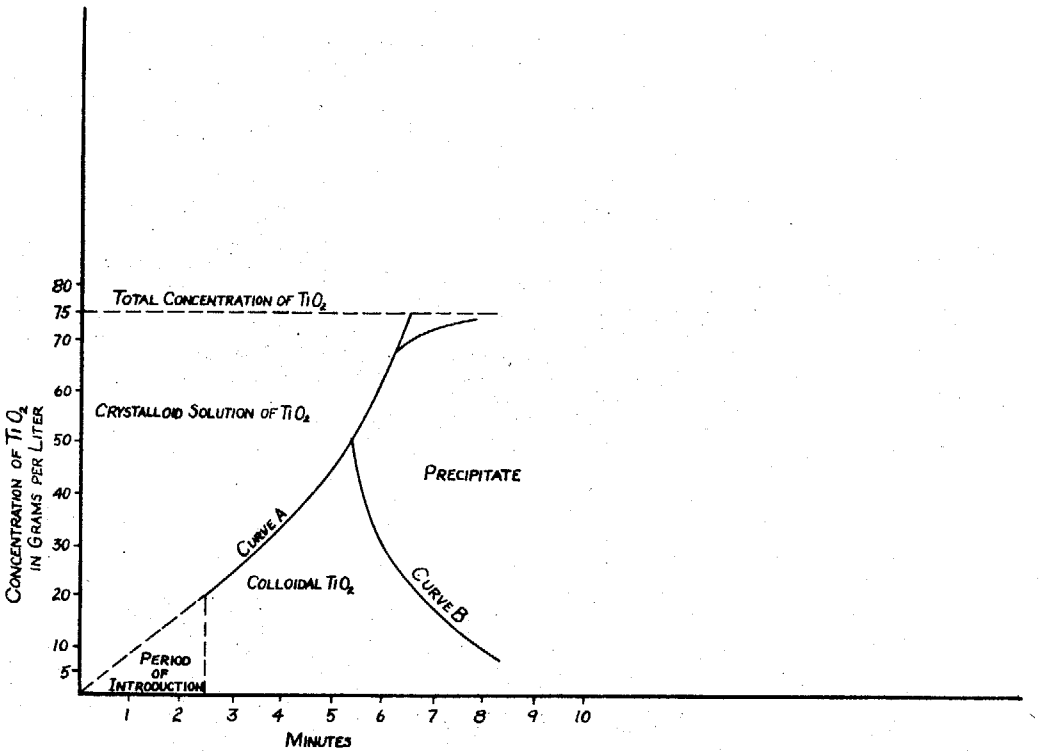

In Fig. 2 there is shown a curve of hydrolysis in which 60 cubic centimeters of titanium solution was added to 100 cc. of water, as in Example I.

Both the final yield of $TiO_2$ from hydrolysis and the quality of the material for pigment purposes, after calcining, is affected by the final acidity of the solution hydrolyzed. In turn, the final acidity is, of course, and expression of the concentration at which the hydrolysis is effected. In Example III, below, a series of hydrolyses of titanium solutions at varying final acidities is shown.

*Example III*

Tests A, B, C and D expresesd below were all based on the introduction of a titanium solution similar to that described in Example I into 100 cc. of boiling water at a uniform rate of mixture. The data is expressed in tabular form, and it will be noted that the hydrolysis at the highest acid concentration (test D) gave the best yield.

| Test | Volume solution added | Time of addition | Final acidity at end of hydrolysis |
|---|---|---|---|
| | *Cubic centimeters* | *Min. Sec.* | *Grams per liter* |
| A | 60 | 2 45 | 200 |
| B | 100 | 4 | 300 |
| C | 200 | 8 | 390 |
| D | 250 | 10 | 420 |

| Test | Time of analysis after introduction | Analysis of mother liquor—g/l | | | Yield of $TiO_2$ |
|---|---|---|---|---|---|
| | | Fe | $TiO_2$ | $H_2SO_4$ | |
| | *Hours* | | | | *Per cent* |
| A | 1½ | 26.3 | 13 | 215 | 85 |
| B | 1½ | 36.8 | 19 | 297 | 84 |
| C | 1½ | 42.0 | 23.2 | 380 | 85 |
| D | 2 | 44.2 | 19.8 | 410 | 88.5 |

The $TiO_2$ produced by these experiments was washed, dried and calcined at 970° C., after which its pigment properties were tested. The $TiO_2$ from test D was found to be generally superior in pigment qualities over the other samples.

*Example IV*

The development of an adequate colloidal phase in the solution, prior to precipitation, depends in part on the speed with which the titanium solution is mixed with the water. This is illustrated in the table of tests reported below. In each case, 250 cc. of the solution mentioned in Example I was added, hot, with stirring to 100 cc. of water, and the reaction was completed as described in Example I.

| Test | Time of addition in minutes | Time of analysis hours after introduction | Analysis of mother liquor g/l | | | Yield of $TiO_2$ |
|---|---|---|---|---|---|---|
| | | | Fe | $TiO_2$ | $H_2SO_4$ | |
| | | | | | | *Per cent* |
| E | 6 | 2 | 43.7 | 76.2 | 415 | 57.0 |
| F | 10 | 2 | 44.2 | 19.8 | 408 | 88.5 |
| G | 14 | 2 | 44.5 | 22.6 | 400 | 87.0 |
| H | 18 | 2 | 45.5 | 26.8 | 425 | 85.0 |
| I | 26 | 2 | 50.8 | 38.0 | 418 | 77.0 |
| J | 34 | 1¾ | 53.6 | 110.0 | 432 | 35.0 (unfilterable colloid) |

The table clearly indicates that most favorable results are attained with a solution of this concentration when the addition occurs at a rate of about 4–6 minutes per volume of solution added to a volume of water. Higher speeds, as in "E", give lower yield and incomplete hydrolysis, due to the fact that an adequate colloidal phase is not formed. If the solution is added at a speed less than the optimum, there is a gradual diminution in yield until, as in the case of "I" and "J", a considerable amount of precipitation occurs before all of the solution is added.

In practicing my hydrolysis process I usually work with titanium solutions having a "free acidity factor" of about 90%; that is, solutions containing a quantity of sulfuric acid 90% in excess of the amount required to react with all of the titanium present to produce titanyl sulfate. The reason why solutions of this character are used is a practical one, but it has nothing to do with the present process. In the extraction of titanium from its ores, such as ilmenite, it has been found that the most rapid and satisfactory results are secured if the amount of sulfuric acid used is 90% in excess of the amount required to produce titanyl sulfate. The solutions used for the hydrolytic precipitation of $TiO_2$ are usually obtained from this source and are hence used at a free acidity predetermined by other considerations.

The "factor of free acidity" described in no way limits my process, which can be performed with equal satisfaction, and without change, in solutions having a free acidity factor of less than 90%. Titanium solutions practically neutral in character may be prepared if care is used, and these solutions may be hydrolyzed in the same manner. On the other hand, solutions with a free acidity factor of over 90% may also be used.

Much more important than the free acidity factor is the total or final acidity of the hydrolyzed solution expressed as sulfuric acid. This acidity will be equal to the free acid originally present prior to hydrolysis, plus the acid produced during the hydrolysis as the result of the precipitation of $TiO_2$. In the industrial production of $TiO_2$ it is naturally desired to conduct all of the operations at as high an acid concentration as possible so that the acid recovered from the process may be concentrated and re-used at a minimum expense. In fact, one of the objects of the present invention is to permit successful operations at a higher acid concentration than that known in the art.

For several practical reasons, it is desirable that the final acidity of the hydrolyzed solution should be in the neighborhood of 400 grams per liter. One of these reasons is the economical one given above. Another is based on the fact that the best recovery of the $TiO_2$ is obtained at this concentration, as was shown in Example III. However, Example III also shows that my improved process is operative at final acidity concentrations below 400 grams per liter.

On the contrary, it is not advisable to operate the process at acid concentrations much above 400 grams per liter because of the tendency of more concentrated solution to crystallize out part of the contained titanium sulfates and a further tendency of the $TiO_2$ to re-dissolve in the acid present.

The final acidity of the hydrolysis mixture is, of course, independent of the precise quantities of titanium solution and water mixed. For example, instead of adding four parts of a mixture containing 600 grams of $H_2SO_4$ per liter to two parts of water, the same final acidity may be produced by adding five parts of a solution containing 480 grams of $H_2SO_4$ per liter to one part of water.

If, instead of using the concentrated solution referred to in Example I, it is preferred to use directly the solution containing about 500 grams of sulphuric acid per liter of solution, the proper end concentration of about 400 grams of sulphuric acid per liter may be obtained by adding the original solution to about one quarter of its volume of water. In this event, it is preferable to add the solution at a faster rate, per volume of solution added to a volume of water.

Titanium solutions originally containing considerably less than 600 grams per liter of sulfuric acid may be hydrolyzed in accordance with my process. In general, more dilute solutions are more easily hydrolyzed and at lower temperatures. On adding a small quantity of such solutions to hot water, colloidal $TiO_2$ is formed in the same manner, and by the same procedure of continuing the addition gradually over a period of several minutes the production of colloidal particles of $TiO_2$, prior to actual precipitation, is effected. This fact was illustrated, indirectly, in Example III, where the final concentration of acid in the mixture was considerably less than 400 grams per liter.

However, the use of titanium solutions containing less than 500–600 grams of sulfuric acid per liter, prior to admixture with water, is unnecessary and impractical in industrial operations, since the handling of larger volumes of liquid and the additional cost attendant on the concentration of very dilute acid for re-use serves no useful purpose.

While I prefer to conduct my process in the manner described in the examples by producing colloidal $TiO_2$ in the solution to be hydrolyzed before actual precipitation takes place, my invention is not so limited. I may, alternatively, add colloidal $TiO_2$ to a solution of titanium in sulfuric acid and then heat the mixture to cause hydrolysis. For example, I may produce a solution rich in colloidal $TiO_2$ in the manner described in Example II and render such a solution stable by merely cooling it when it has reached a maximum concentration of colloidal particles, before any actual precipitation has taken place. This solution may then be mixed with a solution containing 200 grams $TiO_2$ and 500 grams $H_2SO_4$ per liter in such proportions that the mixture will contain about 30 grams per liter of colloidal $TiO_2$. The mixture is then heated to a temperature of about 100° for three hours, whereupon the hydrolysis is complete.

The titanium dioxide produced by my hydrolysis process is removed from the mixture by decantation and filtered, after which it is washed to remove acid, and is dried. The dry $TiO_2$ may be treated in various ways. For the preparation of pigment, it is calcined for about a half hour at a temperature of 950–1,000°. The resultant product is a tough granular material which may be converted into an excellent white pigment by grinding.

While I prefer to use ordinary hot water for the purpose of hydrolyzing titanium solutions, I may, alternatively, employ dilute solutions containing titanium in place of water. Such solutions of lesser concentration of titanium are obtained, for example, as wash water from other process steps and by re-use in the manner described the loss of titanium in the plant may be avoided. In the appended claims, I have used the expression "solution of lesser concentration" as including both pure water and wash waters or other dilute solutions.

I claim:

1. In a process for preparing titanium dioxide by combining a solution of a titanium salt with a solution of lesser concentration, the step which comprises slowly adding at an elevated temperature the titanium solution to the solution of lesser concentration while agitating the mixture so that colloidal particles of titanium compound are produced prior to actual precipitation.

2. The process of precipitating a titanium oxygen compound by hydrolysis which comprises heating to hydrolyzing temperatures a titanium salt solution which contains more colloidal titanium compound in solution at the time actual precipitation begins than a titanium salt solution containing the same amount of total titanium and total acid radicals when prepared cold and heated to the point where actual precipitation begins.

3. The process of precipitating a titanium oxygen compound by hydrolysis which comprises heating to hydrolyzing temperatures a titanium sulfate solution which contains more colloidal titanium compound in solution at the time actual precipitation begins than a titanium sulfate solution containing the same amount of total titanium and total acid radicals when prepared cold and heated to the point where actual precipitation begins.

4. In a process of preparing titanium dioxide by combining a solution of a titanium salt with a solution of lesser concentration, the steps which comprise adding the titanium salt solution to the solution of lesser concentration at an elevated temperature while agitating the mixture and regulating the rate of said addition to produce a solution which at the time actual precipitation begins contains more colloidal titanium compound in solution than a solution containing the same amount of total titanium and total acid radicals when prepared cold and heated to the point where actual precipitation begins.

5. In a process of preparing titanium dioxide by combining a solution of titanium sulfate with a solution of lesser concentration, the steps which comprise adding the titanium sulfate solution to the solution of lesser concentration at an elevated temperature while agitating the mixture and regulating the rate of said addition to produce a solution which at the time actual precipitation begins contains more colloidal titanium compound in solution than a solution containing the same amount of total titanium and total acid radicals when prepared cold and heated to the point where actual precipitation begins.

6. In a process for preparing titanium dioxide by combining a solution of titanium sulfate with a solution of lesser concentration, the steps which comprise adding at an elevated temperature the titanium sulfate solution to the solution of lesser concentration, while agitating the mixture, over a period of a few minutes at such a slow rate that a colloidal titanium compound is formed in the solution in gradually increasing amounts until the completion of the addition and prior to beginning of actual precipitation.

7. In a method of producing titanium dioxide which comprises mixing without diffusion a titanium sulfate solution with a diluent, the steps of maintaining the temperature at about 100° C. and higher, adjusting the concentrations of the combining solutions to produce an acidity at the end of the hydrolysis corresponding to from about 200 to 420 grams per liter of $H_2SO_4$, free and combined with $TiO_2$, and effecting the addition in between 2′ 45″ and 18′, and heating the mixed solution to effect hydrolysis.

8. In a process of hydrolyzing a titanium sulfate solution which produces a yield of about 85% and more of the titanium compound content of said solution and which comprises mixing without diffusion a solution of titanium sulfate with a diluent, the steps of maintaining the temperature, concentrations and rate of said combining within the range comprising temperatures in the neighborhood of 100° C. and higher, concentrations of the combining solutions to produce an acidity at the end of the hydrolysis corresponding to from about 200 to 400 grams per liter of $H_2SO_4$, free and combined with $TiO_2$ and the addition to between 2′ 45″ and 18′, selecting and controlling the aforesaid factors to produce the above yield, and heating the mixed solution to effect hydrolysis.

9. In a process of hydrolyzing a titanium salt solution according to claim 1, the steps of combining said titanium salt solution with a solution of lesser concentration and effecting hydrolysis of the mixed solution under conditions which produce a yield of at least 85% of precipitated titanium oxygen compound, said conditions having been established by combining a similar titanium salt solution with a similar solution of lesser concentration at various rates of addition and at various temperatures, and determining in each instance the yield of precipitated titanium oxygen compound when boiling the mixture for three hours.

10. The process of hydrolyzing a titanium sulfate solution comprising slowly adding at an elevated temperature a titanium sulfate solution to a solution of lesser concentration while agitating the mixture and heating the mixture, the combining of said solutions and heating to effect hydrolysis being effected under conditions which produce a yield of at least 85% of precipitated titanium oxygen compound, said conditions having been established by combining a similar titanium sulfate solution with a similar solution of lesser concentration at various rates of addition and at various temperatures, and determining in each instance the yield of precipitated titanium oxygen compound when boiling the mixture for three hours.

11. In a process of preparing titanium dioxide which comprises as one of its steps combining a solution of a titanium salt with a diluent, the steps which comprise mixing the titanium salt solution with the diluent while agitating the mixture and regulating the rate and conditions of mixing to produce a substantial amount of titanium compound in colloidal solution prior to actual precipitation and heating the solution to effect hydrolysis.

12. In a process of preparing titanium dioxide which comprises as one of its steps combining a solution of titanium sulfate with a diluent, the steps which comprise mixing the titanium sulfate solution with the diluent while agitating the mixture and regulating the rate and conditions of mixing to produce a substantial amount of titanium compound in colloidal solution prior to actual precipitation and heating the solution to effect hydrolysis.

13. In a process of preparing titanium dioxide by combining a solution of titanium sulfate with a solution of lesser concentration, the steps which comprise adding at an elevated temperature and titanium sulfate solution to the solution of lesser concentration while agitating the mixture and regulating the rate of said addition to produce at least 20 grams per liter of titanium compound in colloidal solution prior to actual precipitation.

14. In a process of preparing titanium dioxide by combining a solution of titanium sulfate with a solution of lesser concentration, the steps which comprise adding at an elevated temperature the titanium sulfate solution to the solution of lesser concentration while agitating the mixture and regulating the rate of said addition to produce at least 16% of the total titanium compound present in colloidal form prior to actual precipitation.

15. The process for the production of titanium dioxide which comprises slowly adding with agitation a sulfuric acid solution of titanium, containing about 600 grams per liter of acid and about 220 grams of titanium dioxide, to 40% of its volume of water at an elevated temperature over a period of about 10 minutes, and heating said mixture until precipitation is effected.

16. The process for producing colloidal $TiO_2$ particles in a titanium sulfuric acid solution which comprises slowly adding said solution to a solution of lesser concentration at an elevated temperature and agitating the mixture during said addition.

17. The process for preparing titanium dioxide by combining four parts of a solution containing approximately 200 grams $TiO_2$ and 500 grams $H_2SO_4$ per liter with one part of water which comprises adding the titanium solution to the water at an elevated temperature so that colloidal particles of $TiO_2$ are produced, the mixture being meanwhile agitated, and heating the mixture until precipitation is effected.

18. The process for producing hydrolytically precipitated titanium dioxide which comprises slowly combining a titanium sulfate solution with a diluent at an elevated temperature, the mixture meanwhile being agitated to preserve a substantial homogeneity, whereby colloidal titanium dioxide is slowly formed in a solution of slowly increasing concentration of sulfate ions, and heating the completed admixture until hydrolysis is substantially complete.

19. The process for producing hydrolytically precipitated titanium dioxide which comprises slowly adding a titanium sulfate solution to a diluent, at an elevated temperature, the mixture being agitated to promote homogeneity, and heating the completed mixture until hydrolysis is substantially complete.

20. In a process of preparing titanium dioxide by combining a solution containing a titanium salt with a diluent at an elevated temperature, the steps which comprise adding a concentrated solution of titanium sulfate to the diluent while agitating the mixture at such a rate that after the initial turbidity, the solution will remain clear for about 10 minutes after the addition is completed.

21. In a process of preparing titanium dioxide by combining a solution containing a titanium salt with a diluent at an elevated temperature, the steps which comprise adding a concentrated solution of titanium sulfate to the diluent while agitating the mixture at such a rate that after the initial turbidity, the solution will remain clear for about 10 minutes after the initial turbidity had disappeared.

In witness whereof, I affix my signature.

JOSEPH BLUMENFELD.